(12) United States Patent
Rockenfeller et al.

(10) Patent No.: US 9,822,999 B2
(45) Date of Patent: Nov. 21, 2017

(54) SYSTEMS, DEVICES AND METHODS FOR GAS DISTRIBUTION IN A SORBER

(71) Applicant: ROCKY RESEARCH, Boulder City, NV (US)

(72) Inventors: Uwe Rockenfeller, Boulder City, NV (US); Kaveh Khalili, Boulder City, NV (US)

(73) Assignee: Rocky Research, Boulder City, NV (US)

( * ) Notice: Subject to any disclaimer, the term of this patent is extended or adjusted under 35 U.S.C. 154(b) by 353 days.

(21) Appl. No.: 14/620,988

(22) Filed: Feb. 12, 2015

(65) Prior Publication Data

US 2016/0238286 A1 Aug. 18, 2016

(51) Int. Cl.
F25B 17/00 (2006.01)
F25B 37/00 (2006.01)
F25B 17/08 (2006.01)

(52) U.S. Cl.
CPC ............ *F25B 37/00* (2013.01); *F25B 17/083* (2013.01); *Y02B 30/64* (2013.01)

(58) Field of Classification Search
CPC ........ F15B 37/00; F15B 17/083; F15B 17/08; F15B 27/007; Y02B 30/64; Y02B 30/62
See application file for complete search history.

(56) References Cited

U.S. PATENT DOCUMENTS

| | | | |
|---|---|---|---|
| 1,987,911 A | 1/1935 | Prickett | |
| 5,298,231 A * | 3/1994 | Rockenfeller | ......... B01D 53/34 422/107 |
| 5,441,716 A | 8/1995 | Rockenfeller | |
| 2001/0000858 A1* | 5/2001 | Rockenfeller | ......... C09K 5/047 95/116 |
| 2002/0006365 A1 | 1/2002 | Suzuki et al. | |
| 2012/0160711 A1* | 6/2012 | Yang | ..................... F17C 11/005 206/0.6 |
| 2014/0205529 A1 | 7/2014 | Kindbeiter et al. | |

OTHER PUBLICATIONS

International Search Report in Application No. PCT/US2016/016974, dated Apr. 15, 2016.

* cited by examiner

*Primary Examiner* — Elizabeth Martin
(74) *Attorney, Agent, or Firm* — Knobbe, Martens, Olson & Bear, LLP

(57) ABSTRACT

Features for distributing a sorber gas in cooling, heating or refrigeration systems with sorbers are disclosed. The sorbers may adsorb gas onto a sorbent material and desorb gas therefrom. Distribution of the gas to and from the sorber may be done with porous, rigid tubes. The tubes may be formed of composite material having pores. The pores may be implemented by flowing fluids through the composite material while the material cures. The sorbers may be reinforced with rods to provide greater strength and stability in load-inducing environments. The tubes may extend through the sorbent and thereby provide a channel for the gas to flow to and from the sorbent and the rest of the cooling, heating or refrigeration system.

32 Claims, 15 Drawing Sheets

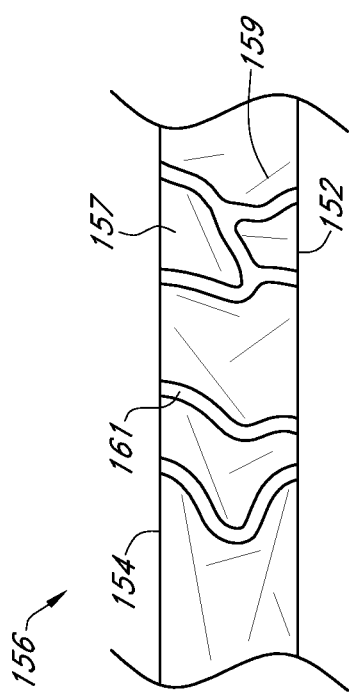

SYSTEMS, DEVICES AND METHODS FOR GAS DISTRIBUTION IN A SORBER

BACKGROUND

Field of the Invention

This disclosure relates generally to sorption refrigeration systems using sorbers and with complex compounds and a sorber gas. In particular, features for distributing the sorber gas in such systems are disclosed.

Description of the Related Art

Adsorption/desorption or also referred to as absorption/desorption reactions between polar gases and certain metal salts yield complex compounds which are the basis for efficient refrigeration, thermal storage, heat pump systems and power systems having high energy density. However, energy density, a measure of the quantity of polar gas adsorbed on the salt, which translates into the amount of work or energy which can be stored in a given amount of the complex compound, is only one parameter to be considered in designing commercially attractive systems.

Of significance, if not greater importance, are the reaction rates between the gas and the complex compound, which result in the time it takes to adsorb and desorb a given amount of the gas into or from the complex compound. Increased or maximized reaction rates result in increased or improved power that can be delivered by the system, i.e., more energy delivered over a period of time, which translates into a greater heating, cooling or power capability of the system.

The reaction rates in these systems are partly a function of how efficiently the gas is distributed to the complex compound. Previous systems have used porous ceramics or cloth to distribute gas to the complex compound. However, the ceramic distributors are fragile and can fracture easily, especially in non-stationary or vibratory environments. For example, ceramic distributors can have difficulty withstanding the vibrations caused by transportation in rough terrain. Cloth distributors have also been found to have some downsides, particularly due to their propensity to clog after multiple cycles. This clogging can increase the pressure drop of the refrigerant in the systems and thereby reduce the performance of the sorber and the absorption system.

SUMMARY

The embodiments disclosed herein each have several aspects no single one of which is solely responsible for the disclosure's desirable attributes. Without limiting the scope of this disclosure, its more prominent features will now be briefly discussed. After considering this discussion, and particularly after reading the section entitled "Detailed Description of Certain Embodiments," one will understand how the features of the embodiments described herein provide advantages over existing systems, devices and methods for distributing gas in complex compound reactors.

In one aspect, an adsorption chilling system is disclosed. The system comprises a first sorber comprising a sorbent configured to adsorb a gas thereon and a rigid gas distribution tube coupled with the first sorber and comprising a porous sidewall defining a channel therein. The tube is configured to allow passage of the gas from an interior of the channel through the porous sidewall and to the sorbent outside the channel.

In some embodiments, the rigid gas distribution tube comprises an elongated matrix defining the porous sidewall, a reinforcement contained in the matrix to form a rigid composite, and a plurality of pores defined by the rigid composite and configured to allow the passage of the gas. The matrix may be an epoxy and the reinforcement may be fiber glass. In some embodiments, the channel is tubular.

In some embodiments, the system further comprises a rigid rod extending along the length of the sorber and supporting the sorbent. The system may also comprise a plurality of the rigid gas distribution tubes. The gas in the system may be ammonia. In some embodiments, the sorbent is one of $SrCl_2$, $CaBr_2$ and/or $MnCl_2$. In some embodiments, the sorbent is one of $CaCl_2$, $MgCl_2$, $CoCl_2$, $FeCl_2$, and/or $SrBr_2$.

In some embodiments, the system further comprises a second sorber in fluid communication with the first sorber, the second sorber comprising the sorbent configured to adsorb the gas thereon, and a second rigid gas distribution tube coupled with the second reaction chamber and comprising a second porous sidewall defining a second channel therein. The second tube is configured to allow passage of the gas from an interior of the second channel through the second porous sidewall and to the sorbent outside the second channel. In some embodiments, the system further comprises a condenser in fluid communication with the first sorber and the second sorber, and an evaporator in fluid communication with the first sorber and the second sorber. The sorber and second sorber may be configured to operate out of phase with respect to each other. The sorber and the second sorber may each comprise a rigid rod extending along the length of each sorber and supporting the sorbent. For purposes of system packaging and possible operation in or out of phase, three or more sorbers may also be used.

In another aspect, an adsorption chilling system is disclosed that comprises a sorber comprising a sorbent configured to adsorb a gas thereon, wherein the sorbent has a loading density of about 0.3 g/cc to 0.7 g/cc. The system further comprises a rigid gas distribution tube coupled with the sorber and comprising a porous sidewall defining a channel therein, wherein the tube is configured to allow passage of the gas from an interior of the channel through the porous sidewall and to the sorbent. The system further comprises an evaporator coupled with the sorber and having an evaporator pressure, wherein the evaporator pressure is about 0.5 bar to about 4 bar. In some embodiments, a differential pressure between the evaporator and the sorber is from about 0.2 bar to about 3 bar. The preferred differential pressure may be about 0.5 bar to 2 bar. In some embodiments, the gas is ammonia. The sorbent may be one of $CaCl_2$, $MgCl_2$, $CoCl_2$, $FeCl_2$, $SrBr_2$, $SrCl_2$, $CaBr_2$ and $MnCl_2$.

In another aspect, a method of distributing a gas to a sorbent in a sorber is disclosed. The method comprises flowing the gas through a channel of a rigid gas distribution tube, the tube comprising a porous sidewall defining a channel therein. The method further comprises permeating at least a portion of the porous sidewall with the gas, and adsorbing the permeated gas onto the sorbent. In some embodiments, the method further comprises desorbing the permeated gas from the sorbent, permeating at least a portion of the porous sidewall of the tube with the desorbed gas, and flowing the desorbed gas through the channel of the tube. Flowing the gas and the desorbed gas may comprise heating or cooling the sorbent, respectively.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through use of the accompanying drawings. In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

FIG. 6C is a cross-section of the sidewall of the porous gas distribution tube of FIG. 6A taken from FIG. 6B along line 6C-6C.

DETAILED DESCRIPTION

Figure 1A:
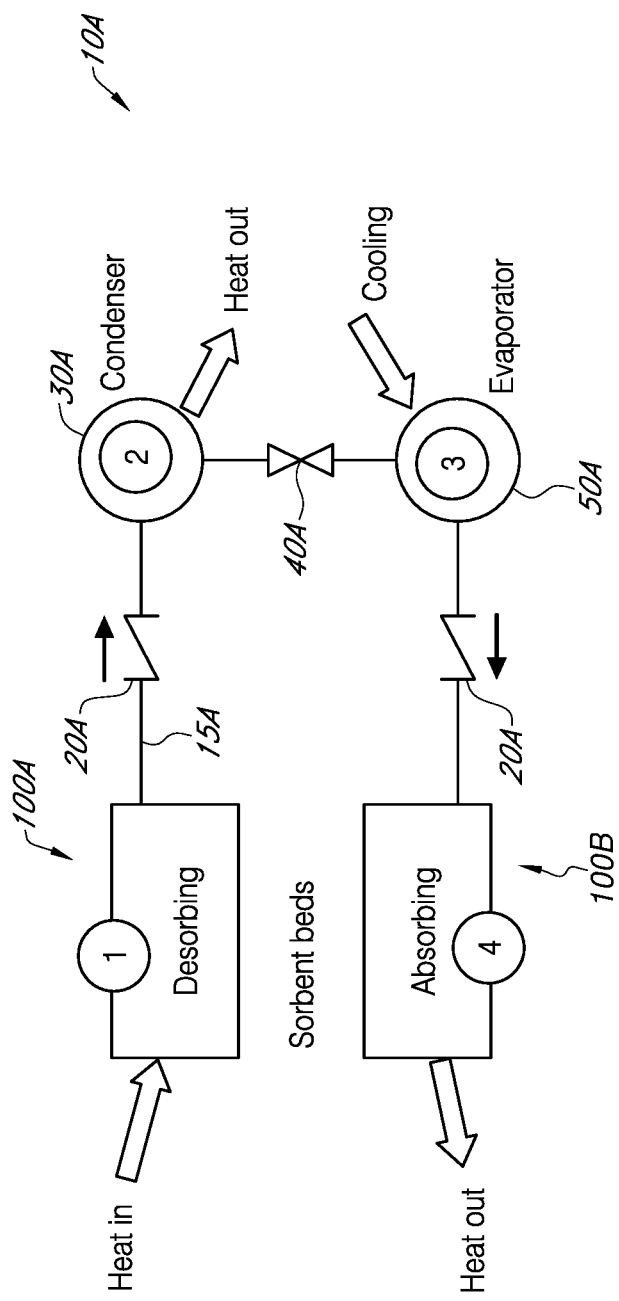
FIG. 1A is a schematic illustration of an embodiment of a sorption refrigeration system.

The following description and examples illustrate embodiments of the present invention in detail. Those of skill in the art will recognize that there are numerous variations and modifications of this invention that are encompassed by its scope. Accordingly, the description of one embodiment should not be deemed to limit the scope of the present invention. In this description, reference is made to the drawings wherein like parts are designated with like numerals throughout.

Systems and methods are disclosed for improved gas distribution in sorption refrigeration systems. Such systems use a sorber gas that adsorbs onto and desorbs from a solid complex compound during a heating or cooling cycle. In embodiments of the invention, as described more fully below, the gas is distributed to the complex compounds by flowing through one or more porous tubes that run through the sorber. Each porous tube may be a rigid composite formed with pores therein to allow gaseous flow through a sidewall of the tube. The system with the porous tube offers a durable and reliable sorption refrigeration system.

Solid-gas sorption reactions, i.e., adsorption and desorption of the gas on the solid, may be carried out under conditions and in an apparatus intended to yield high power densities. Such reactions are preferably capable of achieving maximum power density per mass of adsorbent, maximum power density per mass of reactor and maximum power density per desired or needed reactor volume. Half-cycle times, i.e., adsorption or desorption reaction times of the reactions having improved reaction rates according to the present invention are carried out in less than 30 minutes, preferably in less than about 20 minutes and typically between about 2 and about 15 minutes. It will be understood that not all applications require identical times for adsorption and desorption, and in some cases, one or both reactions may be as short as about 2 minutes, while in other cases, one of the reactions may extend a few minutes beyond 20 minutes. Moreover, during part load conditions, when the equipment is not expected to produce its full cooling capacity, refrigeration, heating or power, reaction times may be extended in order to limit the inherent process cycling and avoiding unnecessary thermal losses. It will be understood that total cycles or full cycle time periods also require a time period for adjusting or changing pressure between adsorption and desorption half-cycles. Thus, a full cycle time period comprises the sum of the half-cycle times plus two pressure-temperature adjustment times, the latter typically each of a few seconds, up to a few minutes.

Optimum reaction rates are dependent on a number of independent parameters including adsorbent density, the mass diffusion path length, the heat or thermal diffusion path length, as well as the thermodynamic operating conditions. The latter include the overall process conditions i.e., the specific temperature and pressure conditions in which the process is carried out, the differential pressure or i.e., the difference between the operating or system pressure and the equilibrium pressure of the complex compound, and the approach temperature or $\Delta T$, which is typically greater than 8° K for the first adsorption reaction. Finally, the parameter of the specific salt constituting the sorbent and the complex compounds formed between the salt and a specific selected polar gas must be considered, it being understood that the characteristics of such salts and the resulting complex compounds, including the equilibrium pressures thereof, are important determinations in balancing the aforesaid parameters to optimize reaction conditions and achieve a system having maximized reaction rates. As sometimes used herein, the term "optimized reaction product" or "optimized complex compound" is a complex compound in which the polar gas sorption process on the metal salt is carried out under process conditions resulting in a complex compound reaction product having the aforesaid characteristics leading to an economic optimum.

Each reaction chamber or reactor module, also referred to herein as a "sorber," has dimensions which determine the thermal diffusion path length (heat transfer) and the mass diffusion path length (mass transfer), respectively. The thermal path length is the distance from a highly thermally conductive surface to the center of the mass of complex compound. A fin or heat conductive tube is an example of such a thermally conductive surface. It should be realized that, as used herein, the term "sorber" may include one or more sorber devices. For example, a sorber may include a plurality of sorber devices positioned within a single shell. Alternatively, a sorber may refer to a series of sorber devices with individual shells acting together as a single sorber within the system.

The mass diffusion path length is the path length of a refrigerant molecule to and from an adsorption particle or molecule. In order to achieve high reaction rates, a sorber should have the capability of moving a substantial amount of refrigerant within the adsorbent mass in a relatively short period of time. The mass diffusion path length is determined by measuring the distance between the point or surface of entry of the gas into the adsorbent mass (inside the sorber outer chamber) to the farthest particle, which represents the greatest distance the gas must travel, to and from molecules or particles of the complex compound, during adsorption and desorption cycles.

It should also to be understood that the flow of refrigerant through the sorbent mass, to and from the adsorption sites, is not simply based on gas permeability or penetration through a porous medium, nor is it based only on gas penetration through a dense product mass contained in a limited volume. Instead, the complex compound adsorbent changes its properties throughout the process as it coordinates and adsorbs the gas molecules. Since the coordination is typically a polar gas adsorbed on the complex compound in one or more coordination spheres, sorption rates are impacted by both the coordination site coverage and by the shielding resulting from accumulation of coordinated polar gas molecules facing incoming polar gas molecules during adsorption. Accordingly, the mass flow path length or mean mass diffusion should be considered in achieving high reaction rates and power density according to the invention.

Thus, in any reactor, not only is a maximum mass transfer distance to an adsorbent particle to be considered, but also and often more importantly the average or mean distance the gas must travel to and from all particles of the mass. As used herein, the term mean mass diffusion path length or distance is defined as the arithmetic mean over all particles of the shortest distance from every particle to a gas permeable surface bordering the compound, gas distribution inlet, outlet or other gas distribution means. Thus, the mean mass diffusion path length is:

$$\frac{\sum_{i=1}^{n} d_i}{n}$$

where $d_i$=shortest distance from $i^{th}$ particle to a gas permeable surface, and n=number of particles. For rapid adsorption and desorption reactions, sorbing a substantial amount of the theoretically available refrigerant coordination sphere in less than about 30 minutes and preferably less than 20 minutes, for each absorption and desorption cycle, the mean mass diffusion path length is less than 15 mm, and preferably about 13 mm or less and more preferably less than 8 mm. In order to meet this critical requirement, the reactor or reaction chamber or chambers of the apparatus in which the adsorbent is present and the gas distribution components, i.e., tubes, reactor walls, channels, inlets, ports, vents etc., are preferably designed so that the mean mass diffusion path as defined above, in such a reactor is 15 mm or less. It is also preferred that at least 60% of the metal salt or complex compound, by weight, is within 25 mm or less of such a gas distribution component. For the group of preferred salts disclosed herein, the most preferred mean mass diffusion path length is between 3 and 7 mm.

Accordingly, one embodiment of the invention is a gas distribution tube that reduces the mass diffusion path length to optimize reaction rates. The gas distribution tube also provides a durable, reliable distribution means that can withstand large applied loads and continue to function as needed in load-inducing environments.

FIG. 1A is a schematic illustration of an embodiment of a sorption refrigeration system 10A. The system 10A includes a first sorber 100A and a second sorber 100B. In some embodiments, such as in industrial operations, there may be multiple refrigeration systems 10A each, where each system 10A within the larger-scale system includes a pair of sorbers 100A,B. The sorbers 100A,B, or multitude thereof, may include a solid complex compound, or sorbent, to and from which a gas may adsorb and desorb, respectively.

The system 10A also includes multiple refrigerant lines 15A running between the sorbers 100A,B and other components in the systems. The lines 15 typically contain heat transfer chemicals, such as ammonia, and provide fluid communication between the various components of the system 10A. For instance, the sorbers 100A,B may each be coupled with one or more of the lines 15A to flow the refrigerant into and out of the sorbers 100A,B. The lines 15A may be formed from any suitable material, including metals or alloys, other materials, or combinations thereof.

The lines 15A may include various valves. As shown in FIG. 1, each line 15A includes a check valve 20A that allows refrigerant flow in the line 15A in only one direction. In some embodiments, the lines 15A include an expansion valve 40A between the condenser and the evaporator, such as a thermal expansion valve. The expansion valve 40A controls the amount of refrigerant flow allowed through the valve 40A.

The system 10A also includes a condenser 30A and an evaporator 50A as part of the refrigeration system. The portion of the system 10A comprising the condenser 30A, the expansion valve 40A, and the evaporator 50A may be identical to a portion of a standard vapor compression refrigeration system, where the pair of sorbers 100A,B substitute as a thermally activated compressor for the mechanical compressor in such a system.

As shown, each sorber 100A,B is fitted with a check valve 20A that can direct vapor exiting the first sorber 100A to the condenser 30A, and only allow inflow to the bottom sorber 100B from the evaporator 50A. Flow of a gas, such as ammonia vapor, to and from the sorbers 100A,B, may follow passively from heating and cooling of the solid complex compounds in the sorbers 100A,B.

Figure 1B:
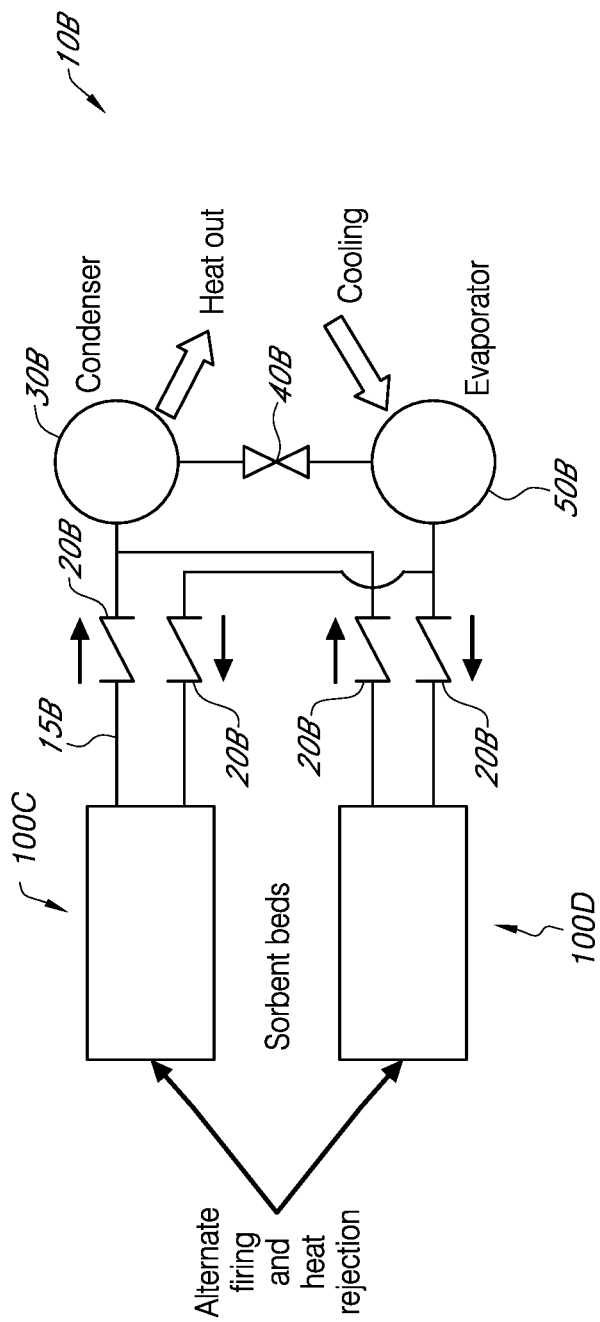
FIG. 1B is a schematic illustration of another embodiment of a sorption refrigeration system that includes two sorbers in alternating operation for continuous refrigeration.

FIG. 1B is a schematic illustration of another embodiment of a sorption refrigeration system 10B that includes two sorbers 100C,D in alternating operation for continuous refrigeration. The system 10B of FIG. 1B differs from the system 10A of FIG. 1A by coupling each sorber 100C,D to a condenser 30B and to an evaporator 50B. An expansion valve 40B controls the amount of refrigerant flow allowed into the evaporator 50B, thereby controlling the superheating at the outlet of the evaporator 50B. As shown, each sorber 100C,D is fitted with a pair of the check valves 20B (non-return valves). These check valves 20B direct vapor exiting the sorber to the condenser 30B, and only allow inflow from the evaporator 50B. Thus flow of the gas to and from the sorbers 100C,D follows passively from alternate heating and cooling of the two sorbers 100C,D.

Figure 2:
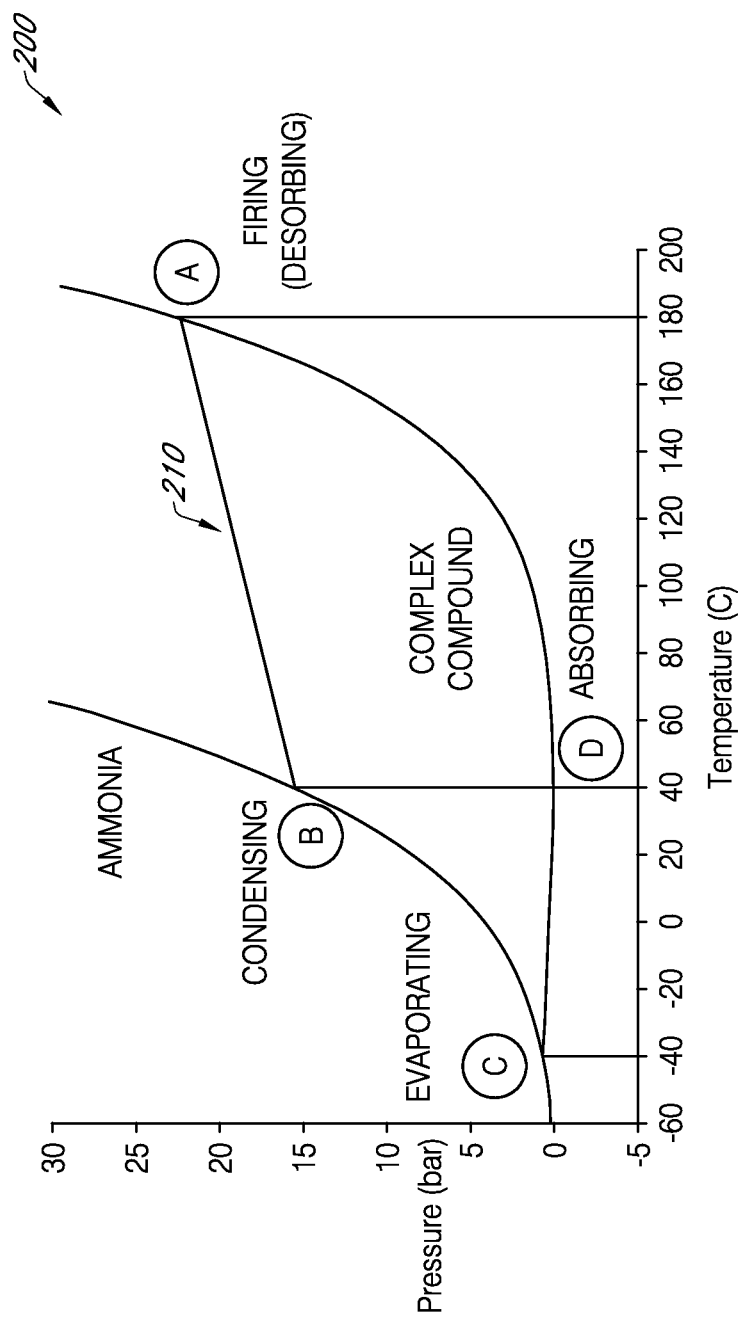
FIG. 2 is a pressure-temperature plot showing an embodiment of a refrigeration cycle that may be used with the system of FIG. 1B.

FIG. 2 is a pressure-temperature plot 200 showing an embodiment of a refrigeration cycle 210 that may be used with the system 10B of FIG. 1B. The same processes in the cycle 210 may be used for sorption refrigeration whether the sorbent is liquid or solid. The processes in the cycle 210 may include sorption of refrigerant from the evaporator 50, heating the sorbent to an elevated temperature, desorption of refrigerant to the condenser 30, and cooling the sorbent back to adsorption temperature. These processes are executed in a continuous manner for liquid-vapor sorption, with the liquid solution being pumped between the absorber and generator (desorber). Solid sorbent systems are periodic, with each sorber 100C,D undergoing these processes sequentially.

The complex compound refrigeration system 10B may use sorbers 100C,D with fixed sorber beds containing solid complex compounds as the sorbent in one or more cycles. In the example cycle 210 shown in FIG. 2, two sorber beds with solid complex compounds are used. Such sorber beds may be contained in the sorbers 100C,D as shown in the system 10B of FIG. 1B, including the various lines 15B, check valves 20B, condenser 30B, expansion valve 40B, and evaporator 50B. In FIG. 2, the vapor pressure of the pure refrigerant, which may be ammonia, and the complex compound are plotted versus temperature. State point letters A, B, C and D on the pressure-temperature plot 200 can be used to trace the cycle 210. At state point A, one sorber bed of a first sorber, such as sorber 100C, is heated until the pressure in the first sorber is greater than pressure in the condenser, shown as state point B. Consequently, ammonia vapor is driven off the complex compound in the first sorber and flows to the condenser and becomes a liquid. In this example, the sorbent is heated to about 180° Celsius to drive the ammonia to a 40° Celsius condenser. Liquid refrigerant then flows from the condenser through the expansion valve where it is isenthalpically expanded and to the evaporator, which is at a much lower pressure. FIG. 2 shows the evaporator at −40° Celsius and about 0.7 bar (state point C). In some embodiments, the pressure in the evaporator is from about 0.5 bar to about 4 bar. The evaporator pressure is maintained by a second sorbent bed in the second sorber, such as sorber 100D, which is cooled to a low enough temperature, most commonly by ambient air or heat transfer fluid, for the sorbent pressure to be below the evaporator pressure. Thus, refrigerant vapor is drawn from the evaporator and into the sorbent in the second sorber. In some embodiments, the differential pressures between the evaporator and the sorber are from about 0.2 bar to about 3 bar. Preferably, the differential pressures between the evaporator and the sorber are from about 0.5 bar to about 2 bar, except for special high power density or burst cooling applications where the differential pressure may be higher.

The adsorption and desorption processes may last from 5 to 30 minutes, or shorter in burst applications. When an adsorption process is complete, that sorbent bed is heated for regeneration (desorption). When the desorption process is complete, the sorbent bed is cooled for adsorption. Thus two sorbent beds may operate alternately, i.e. out of phase, to produce continuous refrigeration. Unequal adsorption and desorption periods can be used to avoid time periods with no suction on the evaporator. More than 2 sorbers can be used to reach most continuous operation.

The desorption reaction is endothermic, so energy is required to drive the desorption as well as heat the sorbent beds. Heat is the energy source which drives the cycle. Heat from many sources can be used, such as gas combustion, waste heat, electrical resistance heat, or solar. Integration of heat into the cycle 210 may be accomplished with pumped loops, heat pipes, thermosyphons, cartridge heaters, and/or other suitable means.

Maintenance of low temperature and pressure of the evaporator during adsorption requires that the sorbers be cooled and maintained near ambient temperature. The adsorption process is exothermic so heat removal is required for the entire adsorption period. Cooling is achieved by forced air flow, pumped loops, phase-change refrigerant, and/or other suitable means depending on the application.

Figure 3A:
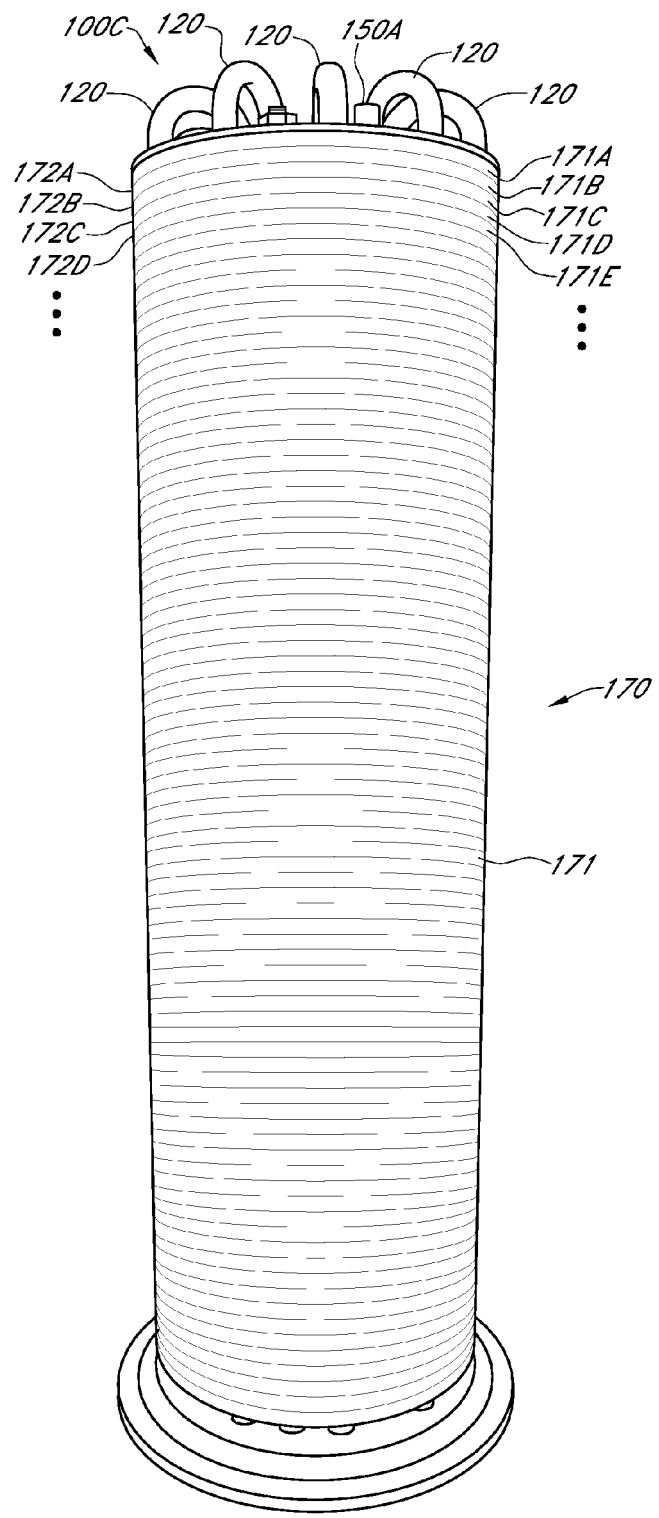
FIG. 3A is a side view of an embodiment of a sorber with porous gas distribution tubes that may be used with the system of FIG. 1B.

FIG. 3A is a side view of an embodiment of a sorber 100C with a porous gas distribution tube 150A traversing the sorber 100C. The sorber 100C generally has an outer shell (not shown) that covers and protects the contents of the sorber 100C and contains the refrigerant pressure.

As shown in FIG. 3A, the sorber 100C has an elongated, cylindrical structure that includes sorbent 170. The sorbent 170 is typically a solid complex compound to which the sorber gas adsorbs. In some embodiments, the sorbent 170 may be formed from a plurality of discs 171. The various shapes and materials of the sorbent 170 are discussed in further detail herein, for example with respect to FIGS. 7A-7B. As shown in FIG. 3A, the sorbent 170 is formed from a plurality of circular, flat discs 171. The discs 171 are aligned along the length of the cylindrical sorber 100C with each of the discs 171 being stacked on top of each other. In some embodiments, each disc 171 may be separated from an adjacent disc 171 by a flat, metallic, heat-transfer fin 172 disposed between the various discs 171. Some of the discs 171 and fins 172 near the top of the sorber 100C are labelled in the figure. As shown, there may be a first disc 171A and a second disc 171B, with a first fin 172A located in between the first disc 171A and the second disc 171B. The sorbent 171 is further formed by discs 171C, 171D, 171E, etc. with fins 172B, 172C, 172D, etc. located in between respective pairs of discs. Further detail of certain embodiments of the fins 172 are discussed herein, for example, with respect to FIGS. 5A-5C.

The sorber 100C includes a plurality of heat transfer tubes 120 that extend through and along the length of the sorber 100C. The heat transfer tubes 120 may provide passageways therein through which a variety of thermal transfer media may travel in order to heat and or cool the sorber 100C. In some embodiments, the heat transfer tubes 120 carry refrigerant possibly undergoing phase change. The refrigerant flowing through the heat transfer tubes 120 may cause the sorbent discs 171 to cool down and/or heat up, in order to cause the sorber gas to adsorb onto and desorb from, respectively, the sorbent discs 171.

The sorber 100C also includes one or more porous gas distribution tubes 150 that extend through the sorbent 170. In some embodiments, the tubes 150 extend substantially along the length of the sorbent 170 and provide channels through which the sorber gas may flow along the length of the tube 150 and contact the sorbent 170 from the inside of the sorber 100C. The sorber gas that flows through the porous gas distribution tubes 150 adsorbs onto the sorbent 170. In some embodiments; i.e. during the desorption, the sorber gas desorbs from the sorbent 170, permeates the gas distribution tube 150, and flows through the tubes 150 and through the sorber 100C.

Figure 3B:
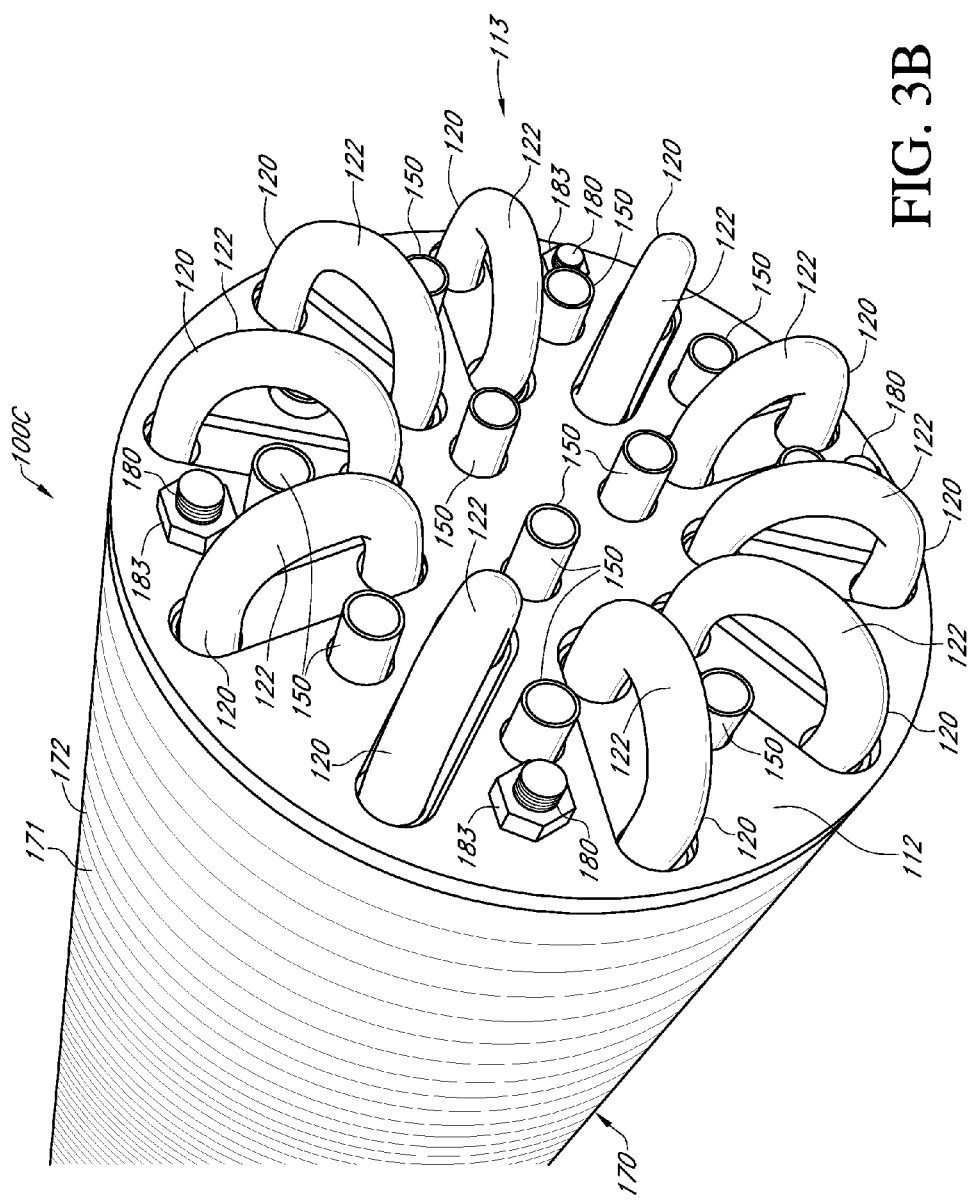
FIG. 3B is a top perspective view of the sorber of FIG. 3A.

FIG. 3B is a top perspective view of an embodiment of the sorber 100C. As shown, an upper end 113 of the sorber 100C may include a cap 112 that seals the upper end of the sorber 100C. The cap 112 may be formed from a variety of materials including but not limited to metal, other suitable materials, and/or combinations thereof. In some embodiments, the cap 112 is formed from steel sheet. The cap 112 may have openings extending through the cap 112 to receive various features of the sorber 100C, for instance, the heat transfer tubes 120 and/or the gas distribution tubes 150. The cap 112 may be on either or both ends of the sorber 100C.

The gas distribution tubes 150 extend through the sorbent 170 and exit the upper end 113 of the sorber 100C through the cap 112. As shown, in this embodiment the tubes 150 are not connected to the rest of a sorption system, such as a condenser 30B and evaporator 50B in the system 10B. It should be realized that an upper housing is typically placed over the cap 112 to seal the sorber so that sorber gas can be introduced into the sorber 100C. That upper housing would extend to and connect with other parts of the system 10B, such as the condenser 30B and the evaporator 50B. As the sorber gas is introduced into the sealed upper housing, it would flow into the tubes 150 and thus enter the sorber 100C to contact the sorbent 170. As shown, there is a plurality of gas distribution tubes 150 extending through the sorber 100C so that the sorber gas is evenly and efficiently distributed within the sorber 100C. As shown, in this embodiment there are thirteen tubes 150. However, there may be more or fewer tubes without departing from embodiments of the invention.

The heat transfer tubes 120 extend through the sorbent 170 and exit the sorber 100C at the cap 112. The heat transfer tubes 120 include a bend 122 in the tube as shown such that the tube 120 bends at an angle of approximately 180° to return back into the sorber 100C. Therefore, the heat transfer tubes 120 may carry refrigerant through the sorbent 170, outside the cap 112, back through the cap 112 and back into the sorbent 170. The heat transfer tubes 120 may have different shaped bends. Further, the heat transfer tubes 120 may have bends 122 on one or both ends of the sorber 100C. In some embodiments, one or both ends of the sorber 100C may include the heat transfer tubes 120 exiting the sorber 100C and connecting to other features of the system 10. For instance, there may be two circuits of heat transfer tubes 120, with a first circuit entering the upper end 113 of the sorber 100C and a second circuit entering the opposite end of the sorber 100C. This "dual circuit" arrangement is discussed in further detail herein, for example with respect to FIGS. 4A-4C.

The sorber 100C also includes a plurality of fastening rods 180. The rods 180 extend along the length of the sorber 100C. The rods 180 extend from the end cap 112 on one end of the sorber 100C, such as the upper end 113, to another end cap (not shown) on the opposite end of the sorber 100C. The rods 180 are formed from a rigid material, such as a metal or metal alloy. In some embodiments, the rods 180 may be formed from other rigid materials, and/or combinations thereof. The rods 180 provide axial support for the sorber 100C. There may be fewer or more than the four rods 180 shown. The rods 180 can be secured to the end cap 112 by a fastener 183, which may be a nut or bolt. The rods 180 may also be secured with a variety of other suitable means. The rods 180 help to maintain the shape and length of the sorber 100C and provide mechanical stability. For instance, the rods 180 may help to withstand loading induced by the environment, such as shaking. In some embodiments, the sorbent 170 may expand and contract with the heating and cooling, and thus the rods may help to maintain the shape of the sorber 100C against an expanding and contracting sorbent 170.

Figure 4A:
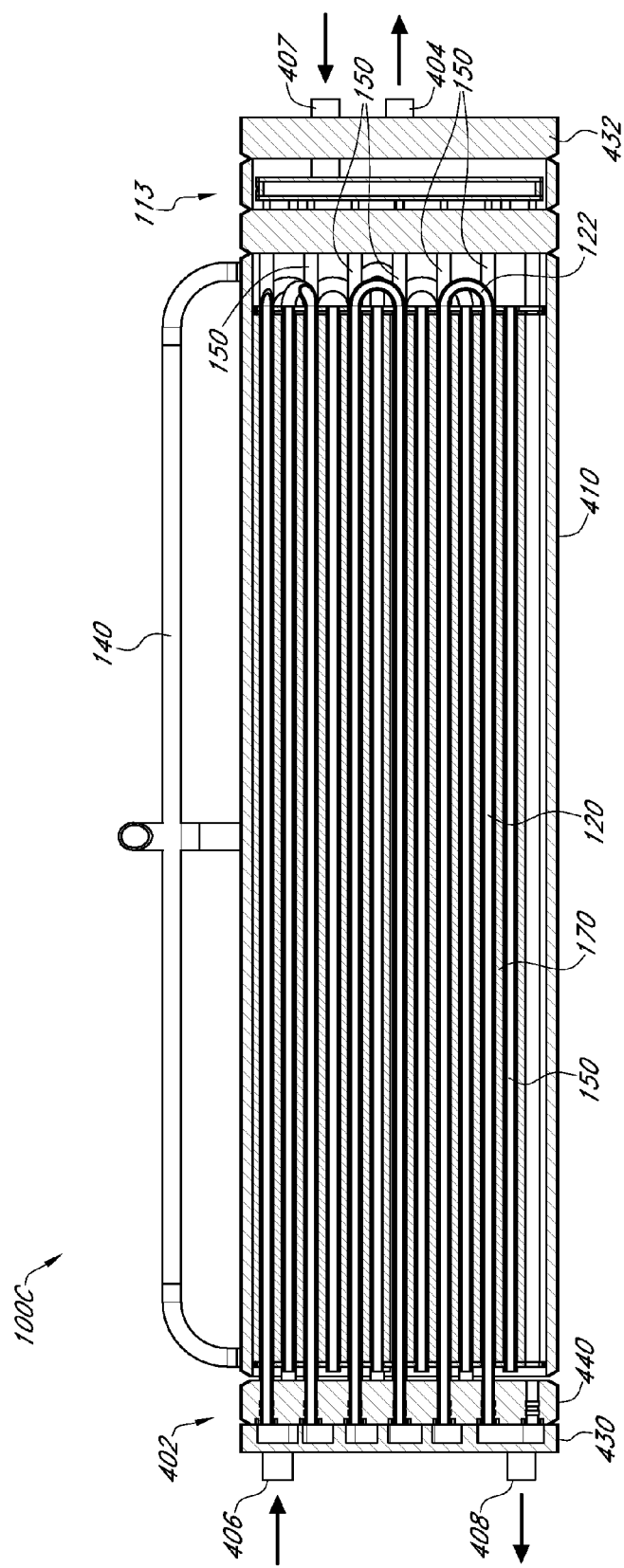
FIGS. 4A-4C are side cross section views of an embodiment of a sorber that may be used with the system of FIG. 1B, showing an arrangement of heat transfer tubes.
Figure 4B:
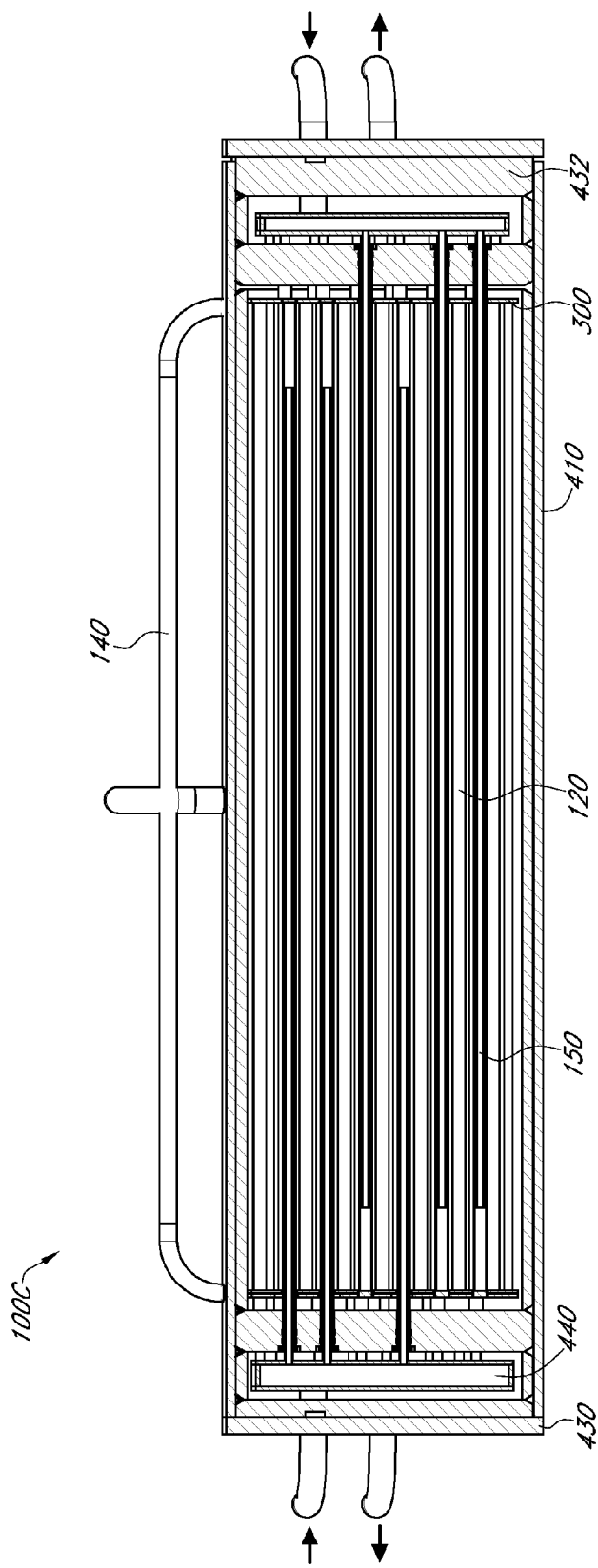
Figure 4C:
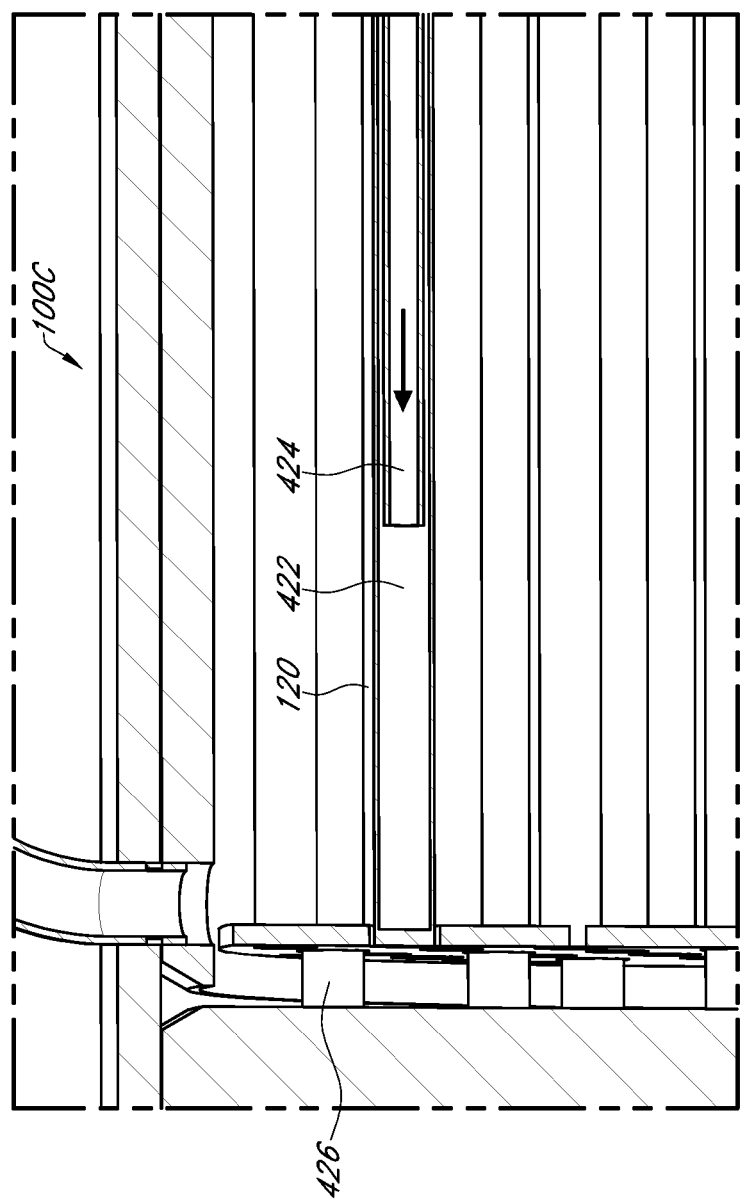

FIGS. 4A-4C are side cross-sectional views of the sorber 100C that may be used with the system 10B. The figures show various views of an arrangement of the heat transfer tubes 120 inside the sorber 100C. FIG. 4A shows the sorber 100C with sorbent 170. FIG. 4B shows the sorber 100C with the sorbent 170 removed for clarity. FIG. 4C is a close up cross-sectional view of a heat transfer tube 120, as discussed below. In some embodiments, the refrigerant used in the heat transfer tubes 120 for the sorber 100C is also used in the overall system 10B. The refrigerant may be used in a phase change mode. Further, any suitable refrigerant may be used.

Referring to FIGS. 4A-4B, the sorber 100C includes a first end 402 and the upper end 113 that is opposite the first end 402. The ends 402, 113 facilitate moving thermal transfer media through the heat transfer tubes 120. The first end 402 includes an inlet 406 and an outlet 408 that communicate with a first circuit of the heat transfer tubes 120. The upper end 113 includes an inlet 407 and an outlet 409 that communicate with a second circuit of the heat transfer tubes 120. The sorber 100C may include other inlets and/or outlets as needed to move thermal transfer media and/or sorber gas through the system. The various inlets and outlets may provide piping or other channels through which the sorber gas and/or refrigerant may flow.

The sorber 100C has an outer shell 410. The shell 410 is an elongated cylindrical layer that surrounds and encapsulates the sorbent 170 and other internal components of the sorber 100C. In some embodiments, the shell 410 may have other suitable shapes and may be composed of more than one layer. The shell 410 is formed from a rigid material such as a metal or metal alloy, but it may be formed from other suitable materials as well. Among other things, the shell 410 acts as a barrier for the sorbent 170 to prevent the sorbent 170 from expanding radially outward.

The first end 402 of the sorber 400 includes a water box 430 and a feed box 440. In some embodiments, the water box 430 is a fluid bonnet. The water box 430 contains a fluid, such as aqua-ammonia, that is then distributed by the feed box 440 through the heat transfer pipes 120.

Similarly, the upper end 113 of the sorber 400 includes a water box 432. The water box 432 may be a cooling fluid bonnet. The water box 432 provides cool fluid to the heat transfer tubes 120. In some embodiments, the heat transfer medium, such as a fluid, flows from the feed box 440 through the tubes 120. The fluid flowing through the tubes 120 may cause heat to transfer to and from the sorbent 170. As mentioned, the tubes 120 have bends 122, which may be "U" shaped bends. The bends 122 may be located on either or both of the ends 402, 113 of the sorber 100C. In some embodiments, the bends 122 are U-shaped and located near the upper end 113 of the sorber. Therefore, in some embodiments the sorber has a dual bonnet design with two circuits for heating and cooling the sorbent 170.

The sorber 100C includes a sorber gas pipe 140 for flowing the sorber gas to and from the sorber 100C. The sorber gas flows from the pipe 140 and into the sorber 100C in various locations. In some embodiments, there may only be one location. As shown, the pipe 140 connects with the sorber 100C at three locations along the side of the sorber 100C. The pipe 140 may also connect with the sorber 100C in other locations. The sorber gas flows from the pipe 140 and into the gas distribution tubes 150. In some embodiments, sorber gas flows from the pipe 140 and into compartments (not shown) in the sorber 100C and then into the tubes 150. A variety of configurations are possible, and these are just some examples. The pips 140 may be connected to two sorbers 100C to exchange the sorber gas between the two sorbers 100C. For instance, the pipe 140 may connect the sorbers 100B shown in FIG. 1B such that the sorber gas is exchanged from one sorber to the other for alternating cooling and heating of the sorbers. While one of the sorbers is desorbing the sorber gas from the sorbent, the other sorber may be adsorbing gas to its sorbent, and vice versa. In this manner, the sorbers 100C may alternately fire and exchange the gas.

FIG. 4C is a close up side cross-section view of the some of the heat transfer tubes 120 from FIG. 4B. As shown, one of the tubes 120 is shown in cross-section to show the interior of the tube 120. The tube 120 includes an outer tube 422 and an inner tube 424. Thus, in this embodiment, the tubes 120 are composed of multiple tubes. As shown, the outer tube 422 surrounds the inner tube 424. In some embodiments, the outer tube 422 and the inner tube 424 are concentric. The inner tube expands and contracts as the temperature of the thermal transfer media changes without causing pressure on the outer tube 422. This dual layer structure can prevent expansion and contraction of the tubes 120 from damaging the interior surfaces of the sorber 100C, such as the sorbent 170. In some embodiments, a first axis defined by the outer tube 422 may be aligned with a second axis defined by the inner tube 424. However, the outer tube 422 and the inner tube 424 need not be exactly aligned. In some embodiments, the inner tube 424 may be off-center with respect to the outer tube 422.

The heat transfer fluid flows through the inner tube 424 and into the outer tube 422. The fluid then flows through the outer tube 422 along the outside of the inner tube 424. For example, as illustrated in FIG. 4C, the fluid travels to the left as illustrated through the inner tube 424, and then in the opposite direction along the outside of the inner tube 424 through the outer tube 422. The pressure in the inner tube 424 causes the fluid to exit the inner tube 424 and travel down the space in between the inner tube 424 and the outer tube 422.

The sorber 100C includes a fitting 426. The fitting 426 allows the tubes 120 to float. As shown, the outer tube 422 has a floating connection with the fitting 426. The outer tube 422 is capped at the end and floats within the fitting 426. The floating connection allows the outer tube 422 to avoid stresses induced by thermal expansion of the tube 120. This is merely one type of connection and other suitable connections may be implemented.

Figure 5A:
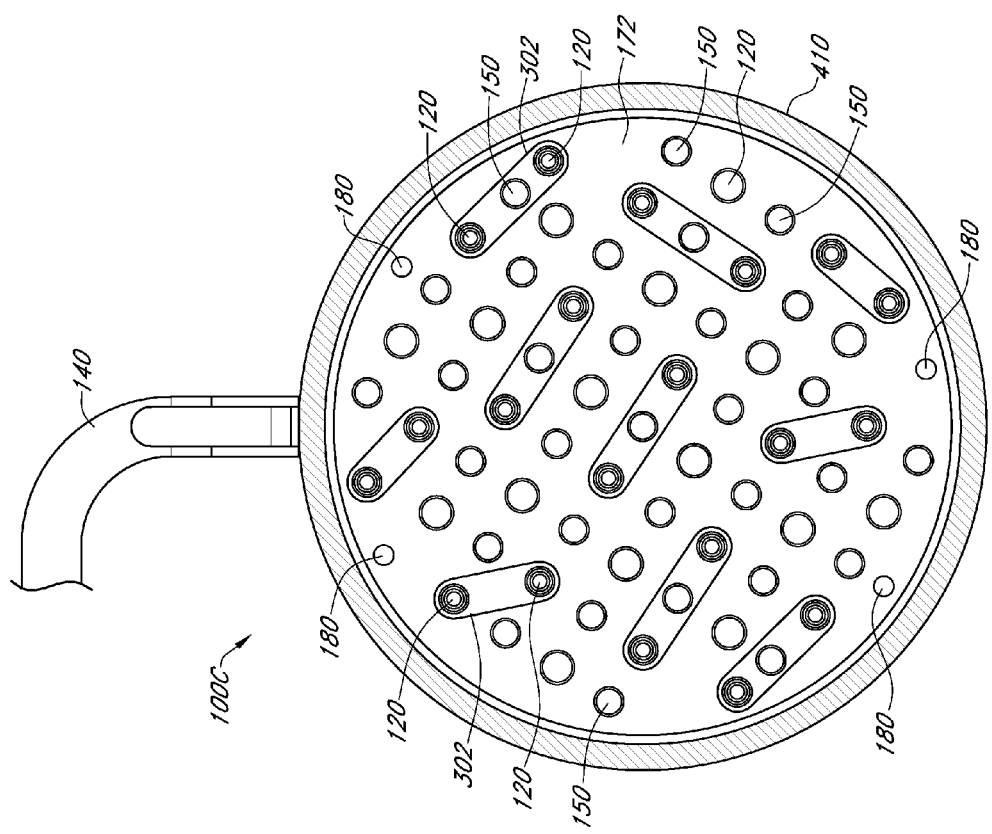
FIG. 5A is a transverse cross-sectional view of the sorber of FIG. 3A showing embodiments of a heat transfer fin with holes for gas distribution tubes and heat transfer pipes.
Figure 5B:
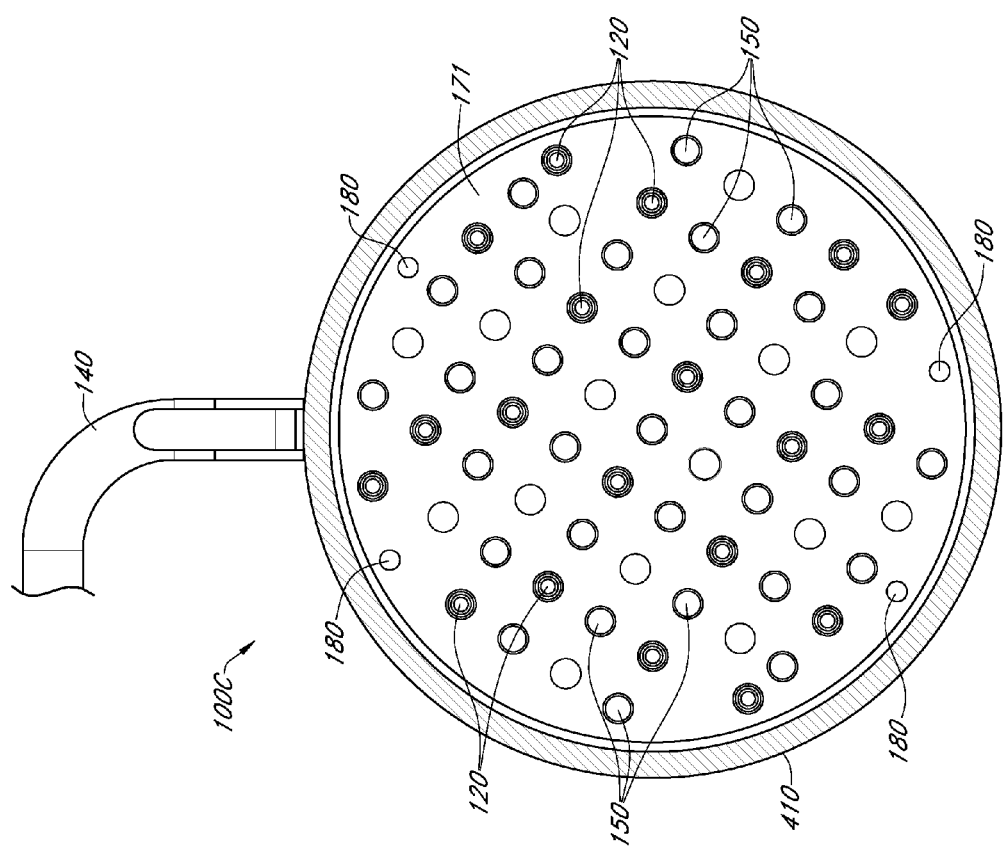
FIG. 5B is the transverse cross-sectional view of FIG. 5A with the heat transfer fin removed.

FIG. 5A is a transverse cross-sectional view of the sorber 100C. An embodiment of a heat transfer fin 172 is shown. FIG. 5B is the same view as FIG. 5A but with the heat transfer fin 172 removed to show a sorbent disc 171 that is underneath the fin 172. The fin 172 has openings for the gas distribution tubes 150 and the heat transfer tubes 120 to extend through the fin 172. The fin 172 is a thermally conductive most often metallic, heat-conducting, plate-like structure that facilitates heat transfer between the heat transfer tubes 120 and the sorbent (not shown). The fin 172 can be positioned in between adjacent portions of sorbent. With the heat transfer tubes 120 extending through the fin 172, a continuous pathway for heat transfer is created from the tubes 120 to portions of the sorbent 170 that are not adjacent to the tubes 120. In this manner, the heat transfer can be spread out more efficiently among all portions of the sorbent 170. The sorbent 170 may be provided in multiple disc-shaped configurations that abut the top and bottom surfaces of the fins 172. Further detail of the sorbent discs 171 is discussed herein, for example with respect to FIGS. 7A-7B.

Cross-sections of the heat transfer tubes 120, the gas distribution tubes 150 and the fastening rods 180 are shown extending through openings in the fin 172 in FIG. 5A and through the sorbent disc 171 in FIG. 5B. The rods 180 are spaced so as to provide axial support to the sorber 100C. There are four rods 180 shown in a generally rectangular-type of arrangement, but there may be more or fewer rods and/or in a variety of arrangements. The heat transfer tubes 120 are spaced generally evenly throughout the cross-sectional area of the sorber 100C. This ensures uniform heat transfer to and from the sorbent 170. The gas distribution tubes 150 are shown generally uniformly spaced. However, the tubes 150 may be in a variety of other suitable configurations. The generally uniform spacing of the tubes 150 allows for efficiently flowing gas to and from the sorbent 170. The spacing of the tubes 150 will impact the mean mass diffusion path length. By having a higher concentration of tubes 150 with substantially uniform spacing, the mean mass diffusion path length can be minimized.

Figure 5C:
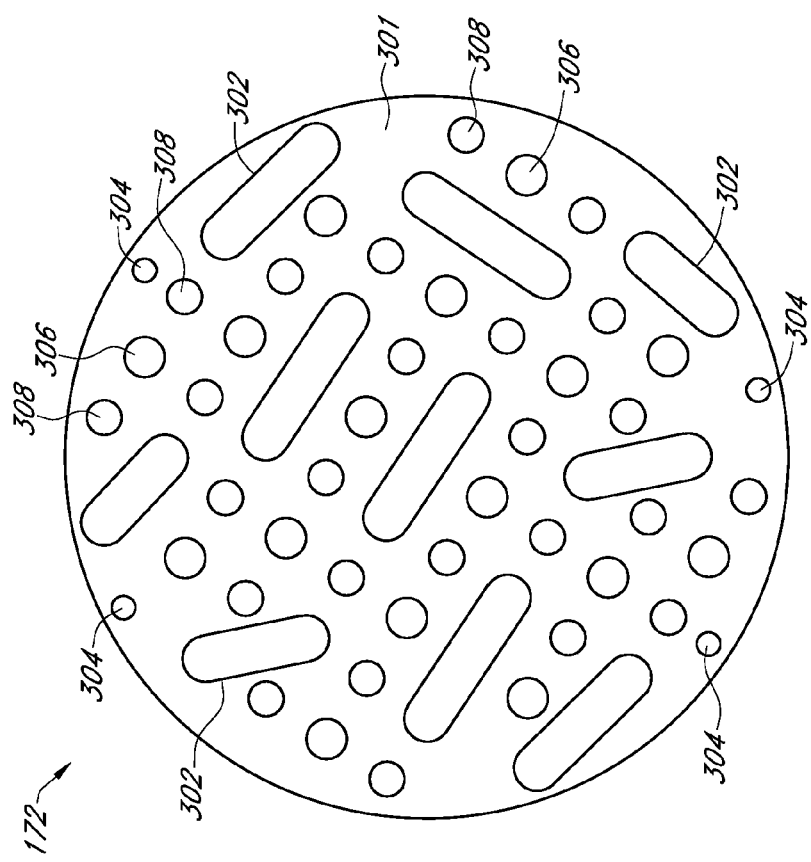
FIG. 5C is a top view of the heat transfer fin from FIG. 5A.

FIG. 5C is a top view of the heat transfer fin 172 from FIG. 5A. The fin 172 includes a plate 301. The plate 301 is generally circular with a planar top and bottom surface, but it may be other shapes and have varying thicknesses as well. The plate 301 is formed from a conductive material, such as a metal or metal alloy. The fin 172 has multiple openings extending through the plate 301. As shown, the fin 172 has multiple slots 302. The slots 302 are elongated holes formed in the plate 301. The slots 302 are shaped to allow for multiple tubes to extend through the slot 302. For instance, the slots 302 are shown as elongated openings that can receive a heat transfer tube 120 as well as a gas distribution tube 150 (see FIG. 5A). Other shapes and sizes of the slots 302 are possible to allow for other combinations of the various tubes to pass through the slots 302. As further shown, the fin 172 also has four rod holes 304. The rod holes 304 are circular openings extending through the plate 301 that allow the rods 115 to pass therethrough. The rod holes 304 can also be in other shapes and sizes and there may be more or fewer than four.

The fin 172 also includes multiple heat transfer tube holes 306 and gas distribution tube holes 308. The heat transfer tube holes 306 are openings extending through the plate 301 that receive the heat transfer tubes 120. The holes 306 are generally circular to accommodate the generally circular tubes 120. The holes 306 are further sized to be adjacent to the tubes 120 to maximize heat transfer from the tubes 120 to the fin 172. In some embodiments, the holes 306 contact the tubes 120. The holes 306 may also be larger than the tubes 120 such that a space is provided between the holes 306 and the tube 120 where the space receives an intermediate conductive component. For instance, for ease of assembly, a conductive fitting may be integrated at the interfaces of the holes 306 and tubes 120.

The gas distribution tube holes 308 are openings extending through the plate 301 that receive the gas distribution tubes 150. The holes 308 are generally circular to accommodate the generally circular tubes 150. In some embodiments, other shapes and sizes of the holes 308 and tubes 150 may be implemented. The holes 308 are sized to receive the tubes 150. The holes 308 may provide a tight or loose fit for the tubes 150. Further, various fittings or brackets may be integrated at the various interfaces between the holes 308 and the tubes 150.

Figure 6A:
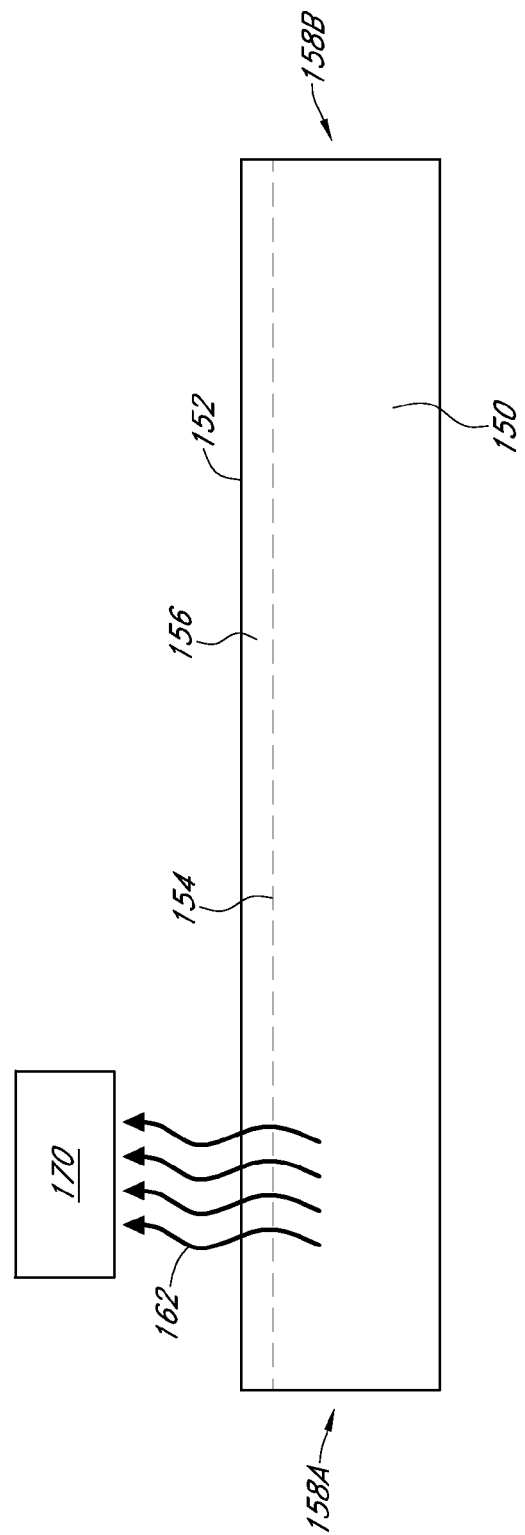
FIG. 6A is a side view of one of the porous gas distribution tubes from the sorber of FIG. 3A.

FIG. 6A is a side view of an embodiment of a porous gas distribution tube 150. The tube 150 may be used in a sorber, such as the sorber 100C. The porous tube 150 is an elongated structure defining an interior channel 160 (shown in FIG.

6C). The porous tube 150 may be used to distribute the sorber gas 162, such as ammonia, to the sorber 100 and/or remove the gas 162 therefrom. It is understood that the tube 150 shown is not to scale and that the proportions of the various dimensions, such as the length, width, and thickness, may be embodied in a variety of different sizes.

As shown in FIG. 6A, the porous tube 150 includes channel openings 158A and 158B. The openings 158A,B are located on either end of the porous tube 150. The tube 150 is shown in isolation from the system 10 in this figure. When integrated with the system 10, the openings 158A,B may be connected to various features of the system 10, such as compartments on the ends 113, 402 of the sorber 100C that are fed gas through the pipe 140. The channel openings 158A,B provide openings to the channel 160.

The tube 150 also includes a porous wall 156. The wall 156 may be formed from a variety of materials. In some embodiments, the wall 156 is formed from an epoxy material that hardens or otherwise becomes rigid while curing. Therefore, the wall 156 may be rigid and porous. The wall 156 may be formed from a variety of other materials, including but not limited to plastic, polymer, epoxy, fibers, woven fibers, other suitable materials, or combinations thereof. The wall 156 may further include one or more reinforcements 159, such as glass or other fibers, discussed in further detail herein, for example with respect to FIG. 6C.

The wall 156 has an inner surface 154 and an outer surface 152. The outer surface 152 is generally on the exterior of the tube 150. The inner surface 154 is generally on the interior of the tube 150 and is therefore shown by the dashed lines in FIG. 6A. The outer surface 152 and inner surface 154 are an exterior and interior surface, respectively, of the wall 156. In some embodiments, the inner and outer surfaces 154, 152 may be surface treatments or other layers on the respective surfaces of the wall 156. The inner surface 154 defines the channel openings 158A,B as well as the channel 160. With this embodiment, the gas 162 can enter the channel 160 at either or both channel openings 158A,B. The gas 162 may then flow through the channel 160 and exit at either or both channel openings 158A,B.

Due to the porous nature of the tube 150, the gas 162 can permeate the porous wall 156 to the outer surface 152, and exit the tube 150. In some embodiments, the sorbent 170 is adjacent, or otherwise near, the outer surface 152, of the tube 150. The gas 162 that exits through the wall 156 may adsorb to the sorbent 170.

The gas 162 may desorb from the sorbent 170 and flow back into the tube 150 through the porous wall 156. In some embodiments, the gas 162 desorbs from the sorbent 170 and flows through the porous wall 156. The gas 162 may flow from the sorbent 170, to the outer surface 152 of the tube 150, through the porous wall 156, to the inner surface 154, and into the channel 160 of the tube 150. The gas 162 may then flow inside the channel 160 and exit the tube 150 through either or both channel openings 158A,B.

Figure 6B:
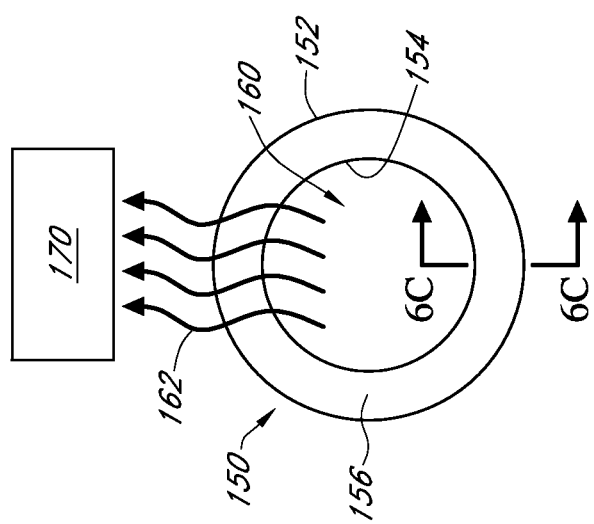
FIG. 6B is an end view of the porous gas distribution tube of FIG. 6A.

FIG. 6B is an end view of the porous gas distribution tube 150. As shown, the wall 156 of the tube 150 has a generally rounded shape. Therefore, the inner surface 154 and the outer surface 152 may be rounded, for example circular. However, the tube 150 may have a variety of shapes. In some embodiments, the profile of the tube 150 is rounded but not circular, such as oval, elliptical, other rounded shapes, and/or combinations thereof. The tube 150 may also have a non-rounded profile. In some embodiments, the tube 150 may have a sidewall 156 with one or more straight or generally straight segments. The tube 150 may therefore have a variety of shapes including but not limited to rounded shapes, straight-segmented shapes, other shapes, and/or combinations thereof. Further, the inner and outer surfaces 154, 152 need not have the same contour. For example, the inner surface 154 may be circular and the outer surface 152 may be rounded but non-circular. These are merely examples and the wall 156 may have a variety of other shapes not explicitly addressed herein.

FIG. 6C is a cross-section view of the sidewall 156 of the porous gas distribution tube 150 taken from FIG. 6B along line 6C-6C. As shown in FIG. 6C, the wall 156 includes a substrate or matrix 157. In some embodiments, the matrix 157 may be formed from a variety of materials, including but not limited to plastic, polymer, epoxy, other suitable materials, or combinations thereof. As shown, the matrix 157 includes reinforcements 159, for example fibers, such as fiberglass. The wall 156 is therefore formed from a composite formed from the matrix 157 and the reinforcements 159. For example, the composite may be formed from a matrix 157 comprising plastic or epoxy and reinforcements 159 comprising glass fibers or other fibers. The reinforcements 159 may be in the form of elongated fibers, short fibers, chopped fibers, other shapes, and/or combinations thereof. The reinforcements 159 are dispersed or otherwise located within the matrix 157. In some embodiments, the reinforcements 159 are dispersed substantially evenly throughout the matrix 157. However, the reinforcements 159 may also be unevenly dispersed in the matrix 157. By "within" it is understood that the reinforcements 159 may be entirely or partially encapsulated by the matrix 157. For instance, some or all of the reinforcements 159 may be partially or wholly disposed on one or more surfaces of the wall 156, such as the inner surface 154 or the outer surface 152.

The wall 156 of the gas distribution tubes 150 includes one or more pores 161. The pores 161 are passageways through the wall 156 providing access for the gas 162. In some embodiments, the pores 161 provide passageways from the inner surface 154 to the outer surface 152. The pores 161 allow the gas 162 to flow from the inner surface 154 to the outer surface 152, and vice versa. The pores 161 have a variety of shapes and sizes. In some embodiments, the pores 161 are shaped and sized to control the amount of gas 162 that permeates or otherwise flows through the wall 156. The pores 161 may be formed by exposing the composite wall 156 to a gas or other fluid flow through a porous mantle while the composite material is curing. The pore sizes, shapes, and locations may be controlled by altering the gas flow used to form the pores. For example, the gas flow may be applied with different flow rates, in different locations, in different directions, and/or in other manners in order to control the size, shape, locations, etc. of the pores 161.

Figure 7A:
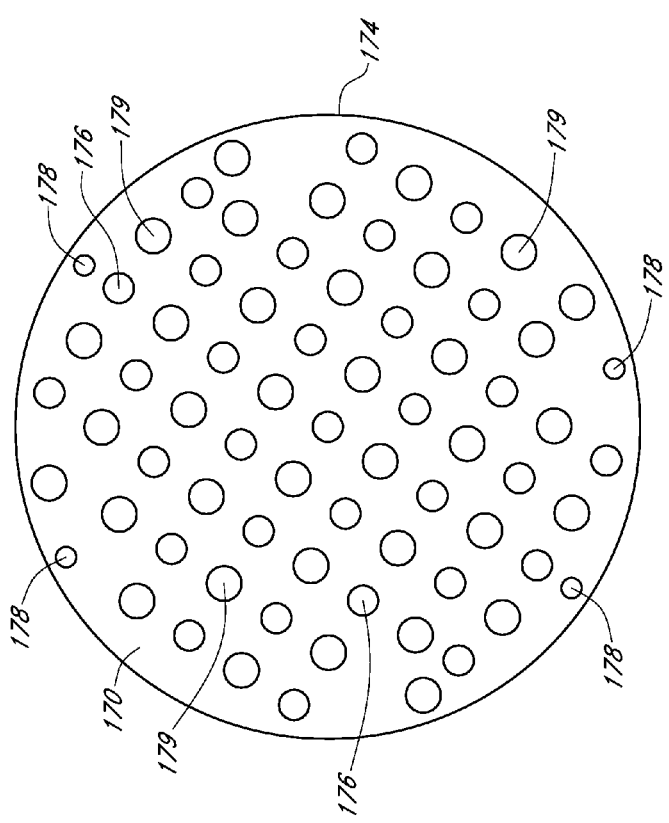
FIG. 7A is a top view of an embodiment of a sorber disc that may be used with the sorber of FIG. 3A.

FIG. 7A is a top view of an embodiment of a sorber disc 171 that may be used with the sorber, such as the sorber 100C. As shown, the sorber disc 171 is rounded in a generally circular shape. However, other shapes may be implemented. The disc 171 has a continuous side 174 forming an outer edge of the disc 171. The disc 171 is formed from the sorbent 170. The sorbent 170 that constitutes the sorber disc 171 may be formed from a variety of solid complex compounds, including but not limited to The sorbent may be one of $CaCl_2$, $MgCl_2$, $CoCl_2$, $FeCl_2$, $SrBr_2$, $SrCl_2$, $CaBr_2$, $MnCl_2$, others or combinations thereof. The discs 171 may contain the complex compounds in varying loading densities. In some embodiments, the sorbent 170 in the discs 171 are impregnated with the complex compounds with loading densities ranging from about 0.3 g/cc (grams per cubic centimeter) to 0.7 g/cc.

The disc 171 has four rod holes 178 extending through the disc 171. The rod holes 178 are openings extending through the disc 171 which receive therein the fastening rods 115. In some embodiments, there may be more or fewer than four rod holes 178. The disc 171 also has multiple gas distribution holes 176 and heat transfer holes 179. The holes 176, 179 receive the gas distribution tubes 150 and the heat transfer tubes 120, respectively. For example, the heat transfer tubes 120 and the gas distribution tubes 150 may extend through the holes 176, 179 of the sorber disc 171.

The sorber 100 most commonly includes multiple sorber discs 171 mounted one on top of the other with a thermally conductive heat transfer fin in between (see FIG. 3A). In this manner, the heat transfer tubes 120 and/or the gas distribution tubes 150 may extend through multiple openings in multiple, adjacent sorber discs 171. The various holes of the multiple sorber discs 171 may be aligned such that the various tubes or rods continuously extend through all of the discs 171. In some embodiments, the heat transfer tubes 120 extending through the holes 179 transfer heat to and from the sorber discs 171. The gas distribution tubes 150 extending through the holes 176 provide passages through which the sorber gas 162 may be distributed to the sorber discs 171 as well as through which the gas 162 may be removed from the sorber disc 171. The Sorber disc 171 may further include a top surface 172 and a bottom surface 176 (shown in FIG. 7B).

Figure 7B:
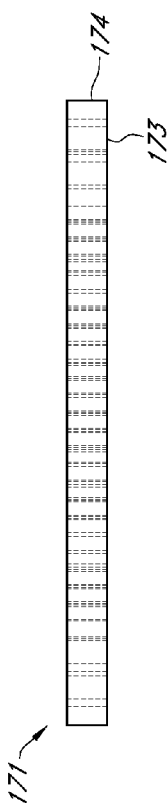
FIG. 7B is a side view of the sorber disc of FIG. 7A.

FIG. 7B is a side view of the sorber disc 171. As shown, the sorber disc 171 is generally flat with the top surface 172 located opposite the bottom surface 176. The side 174 couples the top surface 172 to the bottom surface 176. As shown, the various holes extend from the top surface 172 to the bottom surface 176, creating openings that extend entirely through the thickness of the disc 171.

All references cited herein are incorporated herein by reference in their entirety. To the extent publications and patents or patent applications incorporated by reference contradict the disclosure contained in the specification, the specification is intended to supersede and/or take precedence over any such contradictory material.

The term "comprising" as used herein is synonymous with "including," "containing," or "characterized by," and is inclusive or open-ended and does not exclude additional, unrecited elements or method steps.

All numbers expressing quantities of ingredients, reaction conditions, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained by the present invention. At the very least, and not as an attempt to limit the application of the doctrine of equivalents to the scope of the claims, each numerical parameter should be construed in light of the number of significant digits and ordinary rounding approaches.

The above description discloses several methods and materials of the present invention. This invention is susceptible to modifications in the methods and materials, as well as alterations in the fabrication methods and equipment. Such modifications will become apparent to those skilled in the art from a consideration of this disclosure or practice of the invention disclosed herein. Consequently, it is not intended that this invention be limited to the specific embodiments disclosed herein, but that it cover all modifications and alternatives coming within the true scope and spirit of the invention as embodied in the attached claims.

What is claimed is:

1. An adsorption cooling, heating or refrigeration system comprising:
   a first sorber comprising a sorbent configured to adsorb a gas thereon; and
   a rigid gas distribution tube coupled with the first sorber and comprising a porous sidewall defining a channel therein,
   wherein the tube is configured to allow passage of the gas from an interior of the channel through the porous sidewall and to the sorbent outside the channel.

2. The system of claim 1, wherein the rigid gas distribution tube comprises:
   an elongated matrix defining the porous sidewall;
   a reinforcement contained in the matrix to form a rigid composite; and
   a plurality of pores defined by the rigid composite and configured to allow the passage of the gas.

3. The system of claim 2, wherein the matrix is an epoxy and the reinforcement is fiber glass.

4. The system of claim 1, wherein the channel is tubular.

5. The system of claim 1, further comprising a rigid rod extending along the length of the sorber and supporting the sorbent.

6. The system of claim 1, further comprising a plurality of the rigid gas distribution tubes.

7. The system of claim 1, wherein the gas is ammonia.

8. The system of claim 1, wherein the sorbent is one of $SrCl_2$, $CaBr_2$ and $MnCl_2$.

9. The system of claim 1, further comprising:
   a second sorber in fluid communication with the first sorber, the second sorber comprising the sorbent configured to adsorb the gas thereon; and
   a second rigid gas distribution tube coupled with the second sorber and comprising a second porous sidewall defining a second channel therein,
   wherein the second tube is configured to allow passage of the gas from an interior of the second channel through the second porous sidewall and to the sorbent outside the second channel.

10. The system of claim 9, further comprising:
    a condenser in fluid communication with the first sorber and the second sorber; and
    an evaporator in fluid communication with the first sorber and the second sorber.

11. The system of claim 10, wherein the sorber and second sorber are configured to operate out of phase with respect to each other.

12. The system of claim 11, wherein the sorber and the second sorber each comprise a rigid rod extending along the length of each sorber and supporting the sorbent.

13. The system of claim 9, further comprising:
    a third sorber comprising:
       a sorbent configured to adsorb a gas thereon; and
       a third rigid gas distribution tube coupled with the third sorber and comprising a third porous sidewall defining a third channel therein,
    wherein the third tube is configured to allow passage of the gas from an interior of the third channel through the third porous sidewall and to the sorbent outside the third channel.

14. The system of claim 13, further comprising:
    a fourth sorber in fluid communication with the third sorber, the fourth sorber comprising the sorbent configured to adsorb the gas thereon; and a fourth rigid gas distribution tube coupled with the fourth sorber and comprising a fourth porous sidewall defining a fourth channel therein, wherein the fourth tube is configured to allow passage of the gas from an interior of the fourth channel through the fourth porous sidewall and to the sorbent outside the fourth channel.

15. The system of claim 1, wherein the rigid gas distribution tube comprises an elongated matrix defining the porous sidewall.

16. The system of claim 15, wherein the elongated matrix is an epoxy.

17. The system of claim 1, wherein the first sorber comprises the sorbent configured to adsorb a gaseous thermal transfer media.

18. An adsorption cooling, heating or refrigeration system comprising:
a sorber comprising a sorbent configured to adsorb a gas thereon, wherein the sorbent has a loading density of about 0.3 g/cc to 0.7 g/cc;
a rigid gas distribution tube coupled with the sorber and comprising a porous sidewall defining a channel therein, wherein the tube is configured to allow passage of the gas from an interior of the channel through the porous sidewall and to the sorbent; and
an evaporator coupled with the sorber and having an evaporator pressure, wherein the evaporator pressure is about 0.5 bar to about 4 bar.

19. The system of claim 18, wherein a differential pressure between the evaporator and the sorber is from about 0.2 bar to about 3 bar.

20. The system of claim 19, wherein the differential pressure is about 0.5 bar to 2 bar.

21. The system of claim 18, wherein the gas is ammonia.

22. The system of claim 18, wherein the sorbent is one of $SrCl_2$, $CaBr_2$ and $MnCl_2$.

23. The system of claim 18, wherein the rigid gas distribution tube comprises an elongated matrix defining the porous sidewall.

24. The system of claim 23, wherein the elongated matrix is an epoxy.

25. The system of claim 18, wherein the sorber comprises the sorbent configured to adsorb a gaseous thermal transfer media.

26. A method of distributing a gas to a sorbent in a sorber, the method comprising:
flowing the gas through a channel of a rigid gas distribution tube, the tube comprising a porous sidewall defining a channel therein;
permeating at least a portion of the porous sidewall with the gas; and
adsorbing the permeated gas onto the sorbent.

27. The method of claim 26, further comprising:
desorbing the permeated gas from the sorbent;
permeating at least a portion of the porous sidewall of the tube with the desorbed gas; and
flowing the desorbed gas through the channel of the tube.

28. The method of claim 26, wherein flowing the gas and the desorbed gas comprises heating and cooling the sorbent, respectively.

29. The method of claim 26, wherein the rigid gas distribution tube comprises an elongated matrix defining the porous sidewall.

30. The method of claim 29, wherein the elongated matrix is an epoxy.

31. The method of claim 26, wherein flowing the gas comprises flowing a gaseous thermal transfer media.

32. An adsorption cooling, heating or refrigeration system comprising:
a first sorber comprising a sorbent configured to adsorb a gas thereon;
a rigid gas distribution tube coupled with the first sorber and comprising a porous sidewall defining a channel therein, wherein the gas distribution tube is configured to allow passage of the gas from an interior of the channel through the porous sidewall and to the sorbent outside the channel;
a second sorber in fluid communication with the first sorber, the second sorber comprising the sorbent configured to adsorb the gas thereon; and
a second rigid gas distribution tube coupled with the second sorber and comprising a second porous sidewall defining a second channel therein, wherein the second rigid gas distribution tube is configured to allow passage of the gas from an interior of the second channel through the second porous sidewall and to the sorbent outside the second channel.

* * * * *